US012759423B2

(12) United States Patent
Goergen et al.

(10) Patent No.: US 12,759,423 B2
(45) Date of Patent: Oct. 13, 2026

(54) POWER DISTRIBUTION AND COMMUNICATIONS FOR ELECTRIC VEHICLE

(71) Applicant: Cisco Technology, Inc., San Jose, CA (US)

(72) Inventors: Joel Richard Goergen, Soulsbyville, CA (US); Kameron Rose Hurst, Sonora, CA (US); Sean Ceballos-McGee, Fremont, CA (US); Anant Thakar, Los Altos, CA (US); Robert Gregory Twiss, Chapel Hill, NC (US); Ronald Lee Shaffer, II, Knoxville, TN (US); Jared Pendleton, Knoxville, TN (US); Chad M. Jones, Doylestown, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 642 days.

(21) Appl. No.: 18/336,421

(22) Filed: Jun. 16, 2023

(65) Prior Publication Data

US 2023/0331112 A1 Oct. 19, 2023

Related U.S. Application Data

(62) Division of application No. 16/983,853, filed on Aug. 3, 2020, now Pat. No. 11,708,002.

(51) Int. Cl.

*B60L 53/65* (2019.01)
*B60L 53/66* (2019.01)

(Continued)

(52) U.S. Cl.

CPC ............... *B60L 53/65* (2019.02); *B60L 53/66* (2019.02); *G06F 21/44* (2013.01); *H02J 7/47* (2026.01);

(Continued)

(58) Field of Classification Search

CPC .......... B60L 53/65; B60L 53/66; G06F 21/44; H02J 7/00045; H02J 7/47; H02J 7/60

(Continued)

(56) References Cited

U.S. PATENT DOCUMENTS 7,420,355 B2 9/2008 Liu et al.
7,566,987 B2 7/2009 Black et al.

(Continued)

FOREIGN PATENT DOCUMENTS

CN 1209880 C 7/2005
CN 204836199 U 12/2015

(Continued)

OTHER PUBLICATIONS

Alexander C.K., “Fundamentals of Electric Circuits,” Indian Edition, MATLAB Examples, 2013, 37 Pages.

(Continued)

*Primary Examiner* — Richard V Muralidar

(57) ABSTRACT

In one embodiment, an electric vehicle system includes a power system for charging a battery installed in an electric vehicle and comprising a bi-directional power and data connector for receiving power and data from or transmitting the power and data to an electric vehicle charging device, a communications system comprising a server and configured for receiving power from the power system and receiving data from or transmitting the data to the power system for download or upload at the electric vehicle charging device, and an authentication module for authenticating the electric vehicle charging device. A method is also disclosed herein.

20 Claims, 14 Drawing Sheets

(51) Int. Cl.

| | |
|---|---|
| ***G06F 21/44*** | (2013.01) |
| ***H02J 7/47*** | (2026.01) |
| ***H02J 7/60*** | (2026.01) |
| ***H04L 12/10*** | (2006.01) |
| *H04L 67/10* | (2022.01) |

(52) U.S. Cl.
CPC ................ *H02J 7/60* (2026.01); *H04L 12/10* (2013.01); *H04L 67/10* (2013.01)

(58) Field of Classification Search
USPC .................................................. 320/106, 109
See application file for complete search history.

(56) References Cited

U.S. PATENT DOCUMENTS

| | | | | |
|---|---|---|---|---|
| 8,068,937 | B2 | 11/2011 | Eaves | |
| 8,310,089 | B2 | 11/2012 | Schindler et al. | |
| 8,638,008 | B2 | 1/2014 | Baldwin et al. | |
| 8,768,528 | B2 | 7/2014 | Millar et al. | |
| 8,781,637 | B2 | 7/2014 | Eaves | |
| 9,184,795 | B2 | 11/2015 | Eaves | |
| 9,419,436 | B2 | 8/2016 | Eaves et al. | |
| 9,834,102 | B2 | 12/2017 | Nakaya | |
| 9,853,689 | B2 | 12/2017 | Eaves | |
| 9,893,521 | B2 | 2/2018 | Lowe et al. | |
| 10,166,882 | B2 | 1/2019 | Yang et al. | |
| 10,263,526 | B2 | 4/2019 | Sandusky et al. | |
| 10,281,513 | B1 | 5/2019 | Goergen et al. | |
| 10,407,995 | B2 | 9/2019 | Moeny | |
| 10,442,300 | B2 | 10/2019 | Huston et al. | |
| 10,468,879 | B2 | 11/2019 | Eaves | |
| 10,532,667 | B2 | 1/2020 | Chen et al. | |
| 10,541,543 | B2 | 1/2020 | Eaves | |
| 10,541,758 | B2 | 1/2020 | Goergen et al. | |
| 10,631,443 | B2 | 4/2020 | Byers et al. | |
| 10,672,537 | B2 | 6/2020 | Goergen et al. | |
| 10,680,836 | B1 | 6/2020 | Sironi et al. | |
| 10,714,930 | B1 | 7/2020 | Weiss et al. | |
| 10,732,688 | B2 | 8/2020 | Goergen et al. | |
| 10,735,105 | B2 | 8/2020 | Goergen et al. | |
| 10,752,123 | B2 * | 8/2020 | Patil | B60L 53/63 |
| 10,763,749 | B2 | 9/2020 | Arduini et al. | |
| 10,809,134 | B2 | 10/2020 | Bullock et al. | |
| 10,958,471 | B2 | 3/2021 | Goergen et al. | |
| 11,745,613 | B2 * | 9/2023 | Goergen | H02J 7/04 320/109 |
| 12,275,320 | B2 * | 4/2025 | Goergen | B60S 3/04 |
| 2008/0198635 | A1 | 8/2008 | Hussain et al. | |
| 2011/0057612 | A1 | 3/2011 | Taguchi et al. | |
| 2011/0202418 | A1 | 8/2011 | Kempton et al. | |
| 2011/0273139 | A1 | 11/2011 | Hofheinz | |
| 2012/0043935 | A1 | 2/2012 | Dyer et al. | |
| 2016/0001671 | A1 | 1/2016 | Mori et al. | |
| 2016/0031339 | A1 * | 2/2016 | Geo | B60L 53/16 320/109 |
| 2016/0137087 | A1 | 5/2016 | Haas et al. | |
| 2016/0221463 | A1 | 8/2016 | Kondo et al. | |
| 2016/0294500 | A1 | 10/2016 | Chawgo et al. | |
| 2016/0294568 | A1 | 10/2016 | Chawgo et al. | |
| 2017/0229886 | A1 | 8/2017 | Eaves | |
| 2018/0098201 | A1 | 4/2018 | Torello et al. | |
| 2018/0123360 | A1 | 5/2018 | Eaves | |
| 2018/0313886 | A1 | 11/2018 | Mlyniec et al. | |
| 2019/0272011 | A1 | 9/2019 | Goergen et al. | |
| 2019/0280895 | A1 | 9/2019 | Mather et al. | |
| 2019/0363493 | A1 | 11/2019 | Sironi et al. | |
| 2019/0366872 | A1 | 12/2019 | Kanamori et al. | |
| 2020/0231051 | A1 | 7/2020 | Krogh et al. | |
| 2020/0233472 | A1 | 7/2020 | Jones et al. | |
| 2022/0190587 | A1 | 6/2022 | Eaves et al. | |

FOREIGN PATENT DOCUMENTS

| | | | |
|---|---|---|---|
| CN | 104081237 | B | 10/2016 |
| CN | 104412541 | B | 5/2019 |
| EP | 2073435 | A1 | 6/2009 |
| WO | 2011078397 | A1 | 6/2011 |

OTHER PUBLICATIONS

"Audio/video, Information and Communication Technology Equipment—Part 1: Safety requirements," International Standard, IEC 62368-1, Edition 2.0, Feb. 2014, 680 Pages, ISBN 978-2-8322-1405-3.

"Berkeley Lab ETA, Touch-Safe, High Voltage Digital Electricity Transmission Using Packet Energy Transfer," Vimeo, https://vimeo.com/172469008, Mar. 8, 2016, 8 pages.

"Digital Electricity Gen2 Detailed Installation Manual," Voltserver Digital Electricity, Rev B.1, Nov. 29, 2017, 68 Pages.

Durfee D.A., "Curriculum Vitae," 4 pages.

Eaves S.S., "Network Remote Powering Using Packet Energy Transfer," Proceedings of IEEE International Conference on Telecommunications Energy (INTELEC), Sep. 30, 2012-Oct. 4, 2012, Scottsdale, AZ, 4 Pages.

Edelstein S., "Updated 2016 Tesla Model S Also Gets New 75-kWh Battery Option," Voltserver Exhibit 1018, May 5, 2016, 3 Pages, Archived on Jun. 19, 2016 by Internet Archive Wayback machine at https://web.archive.org/web/20160619001148/https://www.greencarreports.com/news/1103782_updated-2016-tesla-model-s-also-gets-new-75-kwh-battery-option.

"Electrical—Computer Conference Proceedings," Internet Archive WayBack Machine Search for Intelec 2012, Curran Associates, Inc., http://www.proceedings.com/electrical-computer-proceedings.html, 2012, 125 pages.

Hall S.H., "High-Speed Digital System Design, A Handbook of Interconnect Theory and Design Practices," Voltserver Exhibit 1030, Sep. 2000, 55 Pages.

Information Technology Equipment- Safety—Part 1: General requirements, International Standard, IEC 60950-1, Edition 2.2, May 2013, 648 pages, ISBN 978-2-8322-0820-5.

"International Telecommunications Energy Conference: [proceedings] (Full Record)," Library Catalog, https://catalog.oc.gov/vwebv/holdingsInfo?searchId=3810&recPointer=O&recCount=25&searchType=1&bibId=11348322, retrieved from the Internet Feb. 12, 2021, 4 pages.

"International Telecommunications Energy Conference: [proceedings] (Marc Tags)," Library Catalog, https://catalog.loc.gov/vwebv/staffView?searchId=3877&recPointer=O&recCount=25&searchType=1&bibId=11348322, retrieved from the Internet Feb. 12, 2021, 3 pages.

Lathi B.P., et al., "Modern Digital and Analog Communication Systems," Fourth Edition, Jan. 2009, 15 pages.

LC Catalog—Browse, https://catalog.loc.gov/vwebv/searchBrowse, retrieved from the Internet Feb. 12, 2021, 1 page.

"Effects of current on human beings and livestok—Part 1: General aspects," Technical Specification, Basic Safety Publication, IEC/TS 60479-1, Edition 4.0, Jul. 2005, 122 pages, ISBN 2-8318-8096-3.

Low-voltage switchgear and controlgear—Part 1: General rules, International Standard, Amendment 2, IEC 60947-1, Edition 5.0, Sep. 2014, 106 Pages, ISBN 978-2-8322-1798-6.

Microsemi, "Understanding 802.3at PoE Plus Standard Increases Available Power," Jun. 2011, pp. 1-7.

"NFPA 70: National Electrical Code," Voltserver Exhibit 1019, 2017 Edition, 881 Pages.

"Part VII: A Summary of Commonly Used MARC 21 Fields," MARC, Understanding MARC, https://www.loc.gov/marc//Umb/um07to10.html, retrieved from Internet Feb. 13, 2021, 17 pages.

Petition for Post Grant Review of U.S. Pat. No. 10,735,105 [Public] with Exhibits, filed Feb. 16, 2021, PGR 2021-00055, 132 Pages.

Petition for Post Grant Review of U.S. Pat. No. 10,735,105 [Public] with Exhibits, filed Feb. 16, 2021, PGR 2021-00056, 116 Pages.

Sedra A.S., "Microelectronic Circuits," Oxford, Seventh Edition, Jan. 2015, Published on 2014, 38 Pages.

(56) References Cited

OTHER PUBLICATIONS

Stallings W., "Data and Computer Communications," Voltserver Exhibit 1028, Fourth Edition, Jan. 1994, 14 Pages.
Tanenbaum A.S., "Computer Networks," Voltserver Exhibit 1027, Third Edition, Mar. 1996, 12 Pages.
*Voltserver Inc.*, v. *Cisco Systems, Inc.*, "Patent Owner's Preliminary Response to Post Grant Review under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.
*Voltserver Inc.*, v. *Cisco Systems, Inc.*, "Patent Owner's Preliminary Response to Post Grant Review under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Systems, Inc.*, "Decision Denying Institution of Post-Grant Review," United States Patent and Trademark Office, PGR2021-00055, U.S. Pat. No. 10,735,105 B2, Aug. 19, 2021, 25 pages.
*Voltserver Inc.*, v. *Cisco Systems, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Systems, Inc.*, "Declaration of David A. Durfee, Ph.D.," United States Patent and Trademark Office, PGR2021-00055, U.S. Pat. No. 10,735,105, Feb. 16, 2021, 340 pages.
*Voltserver Inc.*, v. *Cisco Systems, Inc.*, "Declaration of Stephens S. Eaves," United States Patent and Trademark Office, PGR2021-00056, U.S. Pat. No. 10,735,105, Feb. 16, 2021, 7 pages.

* cited by examiner

POWER DISTRIBUTION AND COMMUNICATIONS FOR ELECTRIC VEHICLE

CROSS REFERENCE TO RELATED APPLICATION

This application is a divisional of U.S. application Ser. No. 16/983,853, filed Aug. 3, 2020, now U.S. Pat. No. 11,708,002, issued Jul. 25, 2023, the entirety of which is incorporated herein by reference.

TECHNICAL FIELD

The present disclosure relates generally to electric vehicles, and more particularly, to power distribution and communications for an electric vehicle.

BACKGROUND

Electric vehicle (EV) power distribution and data collection are both challenging problems. Rapid, efficient, and safe charging and power distribution is desired along with fast data uploading and downloading. Traditional transfer of data through use of Wi-Fi or cellular is often slow and requires a communications system independent from a power system.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
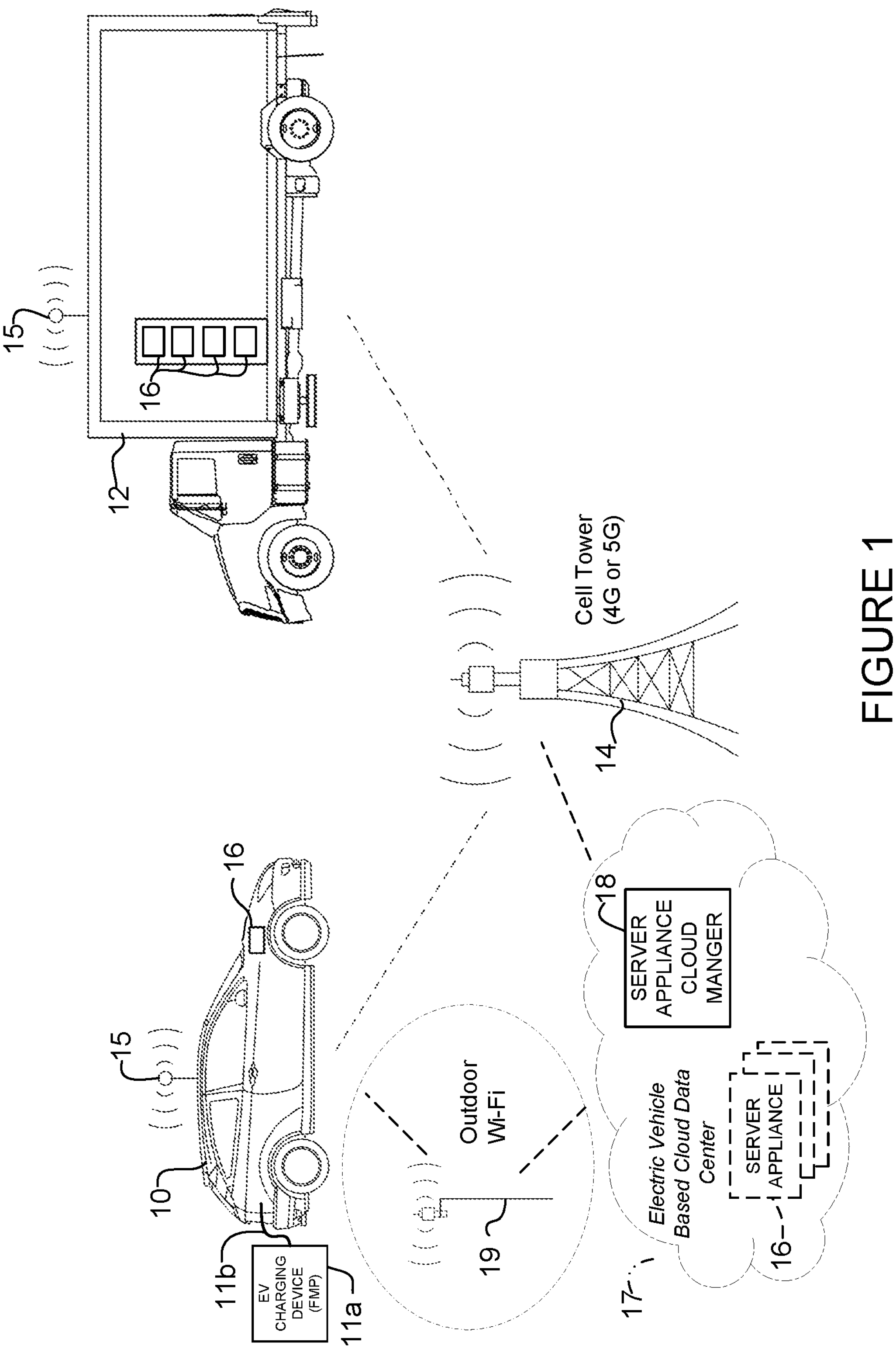
FIG. 1 is an example of an electric vehicle based data center, in accordance with one embodiment.

In one embodiment, an electric vehicle system generally comprises a power system for charging a battery installed in an electric vehicle and comprising a bi-directional power and data connector for receiving power and data from or transmitting the power and data to an electric vehicle charging device, a communications system comprising a server and configured for receiving power from the power system and receiving data from or transmitting the data to the power system for download or upload at the electric vehicle charging device, and an authentication module for authenticating the electric vehicle charging device.

In another embodiment, a system generally comprises a bi-directional power and data connector installed in an electric vehicle for receiving or transmitting power and data on wires coupled to an electric vehicle charging device and charging a battery installed in the electric vehicle, a power and data distribution system coupled to the bi-directional power and data connector for transmitting or receiving the power and data to or from one or more of a server, an electric motor, or electrical components installed in the electric vehicle, and an authentication system for performing authentication between the power and data distribution system and a power and data system coupled to one or more of the server, the electric motor, or the electrical components.

In yet another embodiment, a method generally comprises receiving fault managed power at an electric vehicle, performing authentication between a power system at the electric vehicle and an electric vehicle charging device, charging a battery at the electric vehicle upon passing said authentication at the power system, performing authentication at a communications system, and transferring data between a server at the communications system and the electric vehicle charging device upon passing said authentication at the communications system.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Data center costs are driven by power (required power, backup power, electrical and power distribution equipment), land and building costs (construction, maintenance, permits, taxes), cooling costs (cooling equipment and power to drive the cooling equipment), network connectivity (e.g., fiber optic connections), and repair, infrastructure maintenance, and upgrade costs. If a data center is placed in an electric vehicle (EV), many of these requirements and costs may be eliminated. For example, use of an electric vehicle based data center in place of a conventional data center eliminates the cost of land, building infrastructure, local and backup power, and wiring and cabling costs for fixed server racks. Maintenance and server updates may be performed during regularly scheduled electric vehicle maintenance and software updates.

One example of an electric vehicle based data center is described in U.S. patent application Ser. No. 16/871,877 ("Method and Apparatus for Providing Data Center Functions for Support of an Electric Vehicle Based Data Center"), filed May 11, 2020, which is incorporated herein by reference in its entirety. Implementation of an electric vehicle based data center using conventional power distribution and communications may not provide efficient rapid charging and fast data transfer needed by the electric vehicle. Also, charging and data transfer may need to be secure to prevent tampering with the power and data system. Another drawback with conventional electric vehicle power systems is the safety risk associated with conventional power distribution in the electric vehicle.

The embodiments described herein provide combined power distribution and data communications with authentication to efficiently and effectively support the electric vehicle based data center. As described below, power and data may be provided through the use of Fault Managed Power (FMP).

The term "Fault Managed Power" (FMP) (also referred to as Extended Safe Power (ESP)) as used herein refers to high power (e.g., >100 W), high voltage (e.g., >56V) operation with pulse power delivered on one or more wires or wire pairs. As described below, power and data are transmitted together (in-band) on at least one wire pair. FMP also includes fault detection (e.g., fault detection (safety testing) at initialization and between high voltage pulses), and pulse synchronization between power sourcing equipment (PSE) and a powered device (PD). The power may be transmitted with communications (e.g., bi-directional communications) or without communications.

The term "pulse power" (also referred to as "pulsed power") as used herein refers to power that is delivered in a sequence of pulses (alternating low direct current voltage state and high direct current voltage state) in which the voltage varies between a very small voltage (e.g., close to 0V, 3V) during a pulse-off interval and a larger voltage (e.g., >12V, >24V) during a pulse-on interval. High voltage pulse power (e.g., >56 VDC, >60 VDC, >300 VDC, ~108 VDC, ~380 VDC) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. Pulse power transmission may be through cables, transmission lines, bus bars, backplanes, PCBs (Printed Circuit Boards), and power distribution systems, for example. It is to be understood that the power and voltage levels described herein are only examples and other levels may be used.

As noted above, safety testing (fault sensing) may be performed through a low voltage safety check between high voltage pulses in the pulse power system. Fault sensing may include, for example, line-to-line fault detection with low voltage sensing of the cable or components and line-to-ground fault detection with midpoint grounding. The time between high voltage pulses may be used, for example, for line-to-line resistance testing for faults and the pulse width may be proportional to DC (Direct Current) line-to-line voltage to provide touch-safe fault protection. The testing (fault detection, fault protection, fault sensing, touch-safe protection) may comprise auto-negotiation between power components. The high voltage DC pulse power may be used with a pulse-to-pulse decision for touch-safe line-to-line fault interrogation between pulses for personal safety.

In one or more embodiments, FMP (FMP/ESP) may comprise pulse power transmitted in multiple phases in a multi-phase pulse power system with pulses offset from one another between wires or wire pairs to provide continuous power. One or more embodiments may, for example, use multi-phase pulse power to achieve less loss, with continuous uninterrupted power with overlapping phase pulses, as described in U.S. patent application Ser. No. 16/380,954 ("Multiple Phase Pulse Power in a Network Communications System"), filed Apr. 10, 2019, which is incorporated herein by reference in its entirety.

As described below, FMP may be converted into Power over Ethernet (PoE) and used to power electrical components within the electric vehicle. In one or more embodiments, power may be supplied using Single Pair Ethernet (SPE) and may include data communications (e.g. 1-10GE (Gigabit Ethernet)). The power system may be configured for PoE (e.g., conventional PoE or PoE+ at a power level <100 watts (W), at a voltage level <57 volts (V), according to IEEE 802.3af, IEEE 802.3at, or IEEE 802.3bt), Power over Fiber (PoF), advanced power over data, FMP, or any other power over communications system in accordance with current or future standards, which may be used to pass electrical power along with data to allow a single cable to provide both data connectivity and electrical power to components (e.g., battery charging components, server data components, electric vehicle components).

Referring now to the drawings, and first to FIG. 1, an example of an electric vehicle (EV) based cloud data center 17, is shown in accordance with one embodiment. One or more servers (server blades) are located in an electric vehicle (car 10, truck 12) and interface with a cell tower 14 (e.g., 4G, 5G tower point) through an antenna 15. The server (or servers) and associated components (e.g., router and wireless module described below with respect to FIG. 2) are referred to herein as a server appliance (or communications system) 16 and may be installed in any suitable location within the electric vehicle 10, 12. The truck 12 may comprise a plurality of server appliances 16 in a server appliance rack. The electric vehicle based cloud data center 17 is managed by a server appliance cloud manager 18. The server appliance cloud manager 18 may comprise any number of components such as zone managers or regional managers that may communicate with a central office. As shown in FIG. 1, one or more of the electric vehicles may also be in communication with the server appliance cloud manager 18 through Wi-Fi 19 (e.g., outdoor Wi-Fi or other access point (AP) in Wi-Fi network). As described in detail below, communications with the SA cloud manager 18 or data transfer with another network may also be performed during charging of the electric vehicle at an EV charging device 11*a* through power and data connection (FMP connection) 11*b*.

The server appliance cloud manager operates 18 in the electric vehicle based cloud managed data center 17, which distributes data center functions (e.g., collecting, storing, processing, distributing, or allowing access to data) to a plurality of servers (in server appliances 16) located in a plurality of electric vehicles 10, 12. The electric vehicle based data center 17 may provide services including, for example, data storage, data backup and recovery, data processing, data management, data networking, and other services. The electric vehicle based cloud managed data center 17 allocates resources (e.g., processing, memory, local storage, services, network connectivity, or other computing resources) to the servers within the server appliances 16 and may utilize, for example, virtual machines to move resources between servers, microservices for applications, orchestration to manage applications, or any other virtualization tools or virtualized infrastructure that supports applications and workloads across the physical servers and into a cloud environment.

The electric vehicle based cloud data center 17 may provide data functions to support and operate as an enterprise data center, hyperscale data center, telecom data center, managed services data center, or any other type of data center. The electric vehicle based data center 17 may include any number of servers (e.g., 500, 1,000, 5,000, 10,000, >10,000, or any other number of servers).

It is to be understood that the network shown in FIG. 1 is a simplified schematic and the network may include any number of server appliances 16 located in any number of electric vehicles 10, 12 in wireless communication over any number of cell towers 14, Wi-Fi networks 19, or other wireless communication stations. Furthermore, the electric vehicles 10, 12 shown in FIG. 1 are only examples and any type of electric vehicle may be used with one or more server appliances positioned in any suitable location within the vehicle. The server appliance 16 may also be configured such that servers or server appliances may be easily added or removed depending on space availability within the electric vehicle for applications such as the truck 12 in which available space may vary depending on the usage.

While an example of a EV data center comprising a plurality of electric vehicles in wireless communication is described above with respect to FIG. 1, it is to be understood that the server appliance 16 located in the electric vehicle may only communicate with one or more stationary networks during charging as described below, or may communicate with both the EV mobile data center and communicate with one or more networks during charging.

Figure 2:
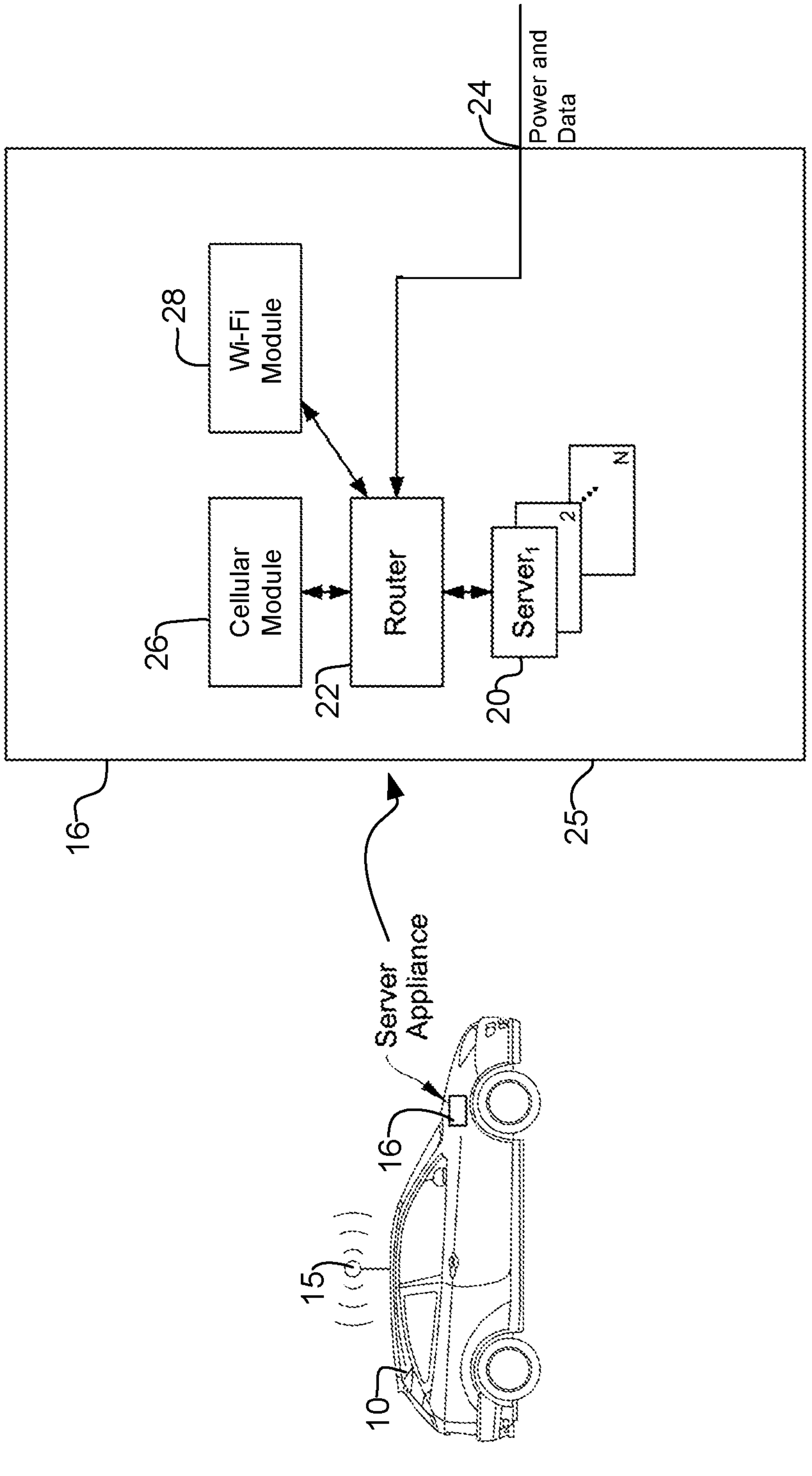
FIG. 2 illustrates details of a server appliance installed in the electric vehicle, in accordance with one embodiment.

Referring now to FIG. 2, a block diagram illustrating components of the server appliance 16 is shown in accordance with one embodiment. The server appliance 16 may be in wireless communication with the cell tower 14 or Wi-Fi device 19 or in communication with the EV charging device 11*a*, as previously described (FIGS. 1 and 2). The server appliance 16 may include, for example, one or more servers 20 (server$_1$, server$_2$, . . . server$_N$) in communication with a router 22. The router 22 is in communication with a wireless module (interface) (e.g., cellular module 26 (e.g., 4G/5G), Wi-Fi module 28) for communication with the electric vehicle based cloud data center in which the servers 20 are configured to operate. The server appliance 16 further includes a power and data interface for receiving power and data from the electric vehicle battery or power distribution system, as described in detail below. In the example shown in FIG. 2, power is received at the router 22, which distributes power to the other components. Details of the power and data interface 24 at the server appliance are described below with respect to FIGS. 4 and 7.

The server appliance 16 is contained within a housing 25 configured for mounting in the electric vehicle 10. The housing 25 may be any shape suitable to fit within available space in the car, preferably without significant impact to operating features of the electric vehicle (e.g., trunk space, vehicle weight). The server appliance or server appliance rack in a truck is preferably configured for ease of installment, modification (e.g., changing number of servers or server appliances based on space availability), or server maintenance or upgrade. The housing 25 may be configured for receiving cooling air through an air inlet, fan, or other means. It is to be understood that the term 'server appliance' or 'communications system' as used herein may refer to any type of structure comprising multiple servers (server blades) and related components and configured for mounting in an electric vehicle.

For simplification, only the server appliance 16 is shown in the EV 10. The power distribution system and other power components (power system, electric motor, electrical components) described below may be located at any suitable location within the electric vehicle. For example, a power and data connector may be positioned at a charging port for receiving power and data from the EV charging device 11*a* at connection 11*b* (FIG. 1).

Figure 3:
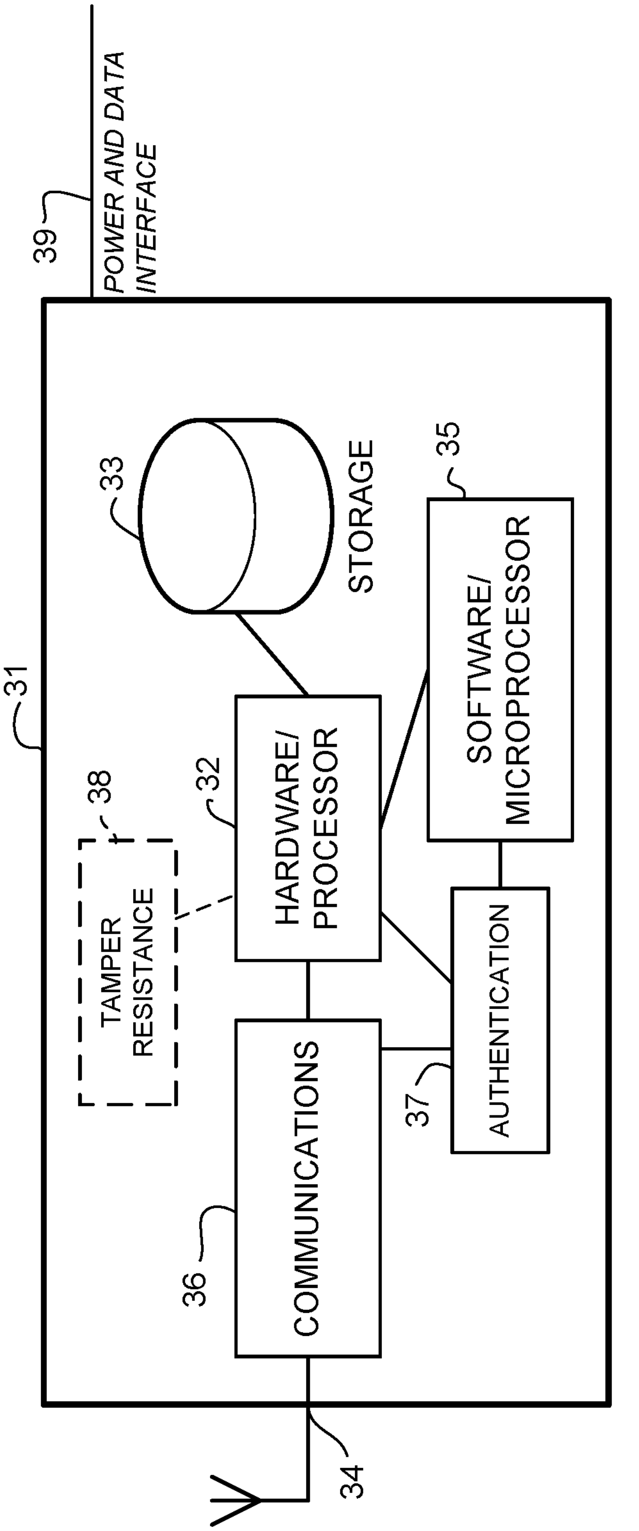
FIG. 3 is a block diagram depicting an example of components that may be used within the server appliance or power distribution system to implement the embodiments described herein.

FIG. 3 illustrates an example of a device 31 (e.g., power system and/or communications system installed at electric vehicle) that may be used to implement one or more embodiments described herein. In one or more embodiments, the device 31 is a programmable machine that may be implemented in hardware, software, or any combination thereof. The device 31 includes one or more processors 32 (e.g., hardware/processor), memory (local or cloud storage) 33, wireless interface 34, software 35 (e.g., controller, authentication software, logic, microprocessor), and power and data interface 39.

Storage 33 may be a volatile memory or non-volatile storage, which stores various applications, operating systems, modules, and data for execution and use by the processor 32. The device 31 may include any number of memory components.

Logic (software, firmware, control logic, code) may be encoded in one or more tangible media for execution by the processor 32. For example, the processor 32 may execute codes stored in a computer-readable medium such as memory 33. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The device 31 may include any number of processors 32 or microprocessors. In one or more embodiments, components of the device 31 may be configured to implement processes described below with respect to flowcharts of FIGS. 13 and 14.

The device 31 includes one or more power and data interfaces 39 to provide power to the components from the electric vehicle battery or power system. Power may be delivered directly from the battery or may be modified for delivery as FMP or PoE as described in detail below.

As shown in FIG. 3, the device 31 may include one or more components to address security. For example, the device 31 may include a communications module 36 comprising one or more security features, hardware/software trust authentication module 37, and a tamper resistant device or mechanism 38.

It is to be understood that the device 31 shown in FIG. 3 and described above is only an example and that different configurations of devices (with more or fewer components) may be used. For example, the device 31 may further include any suitable combination of hardware, software, algorithms, processors, devices, components, or elements operable to facilitate the capabilities described herein.

Figure 4:
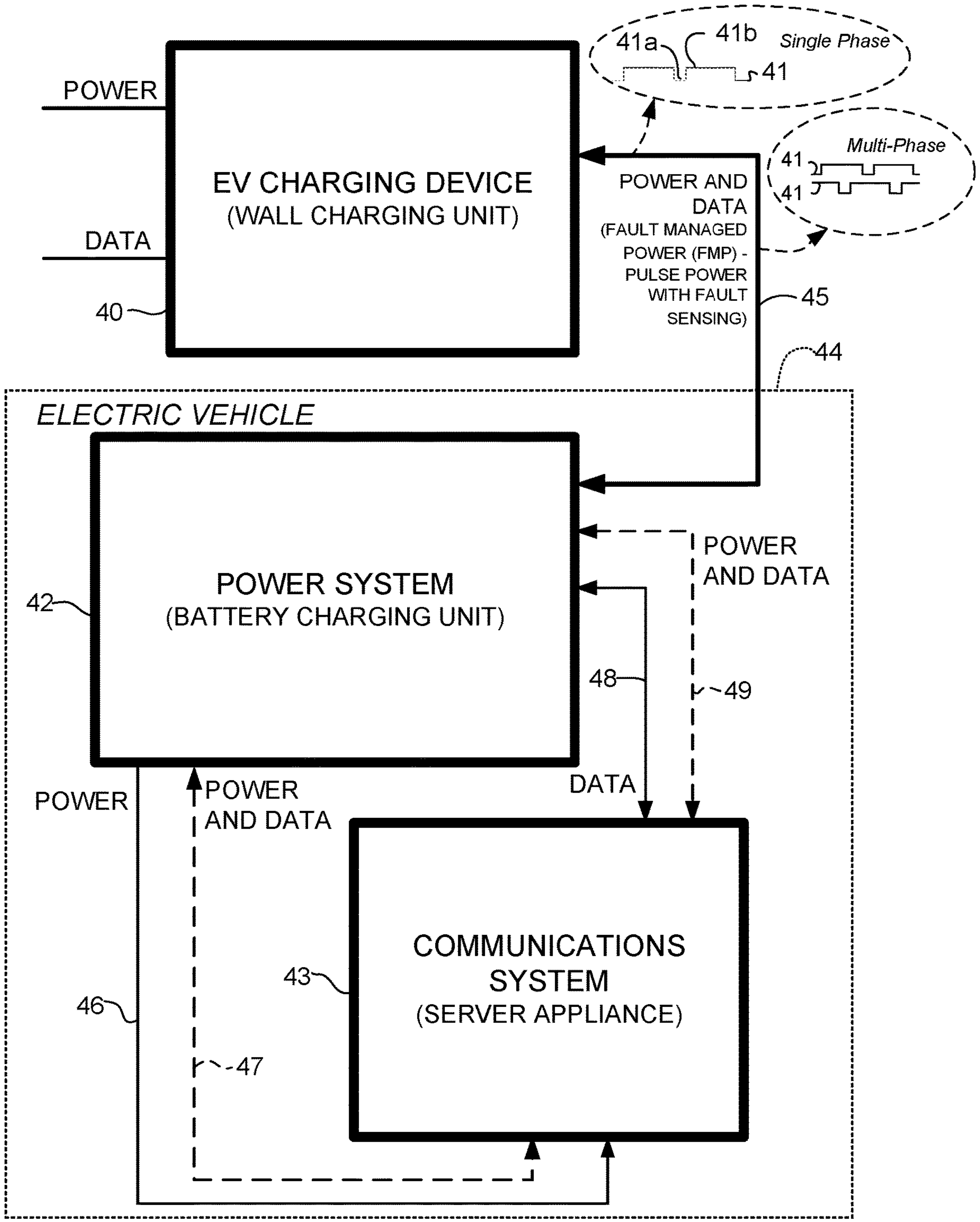
FIG. 4 is a block diagram illustrating an overview of an electric vehicle charging device connected to a power system and communications system at the electric vehicle, in accordance with one embodiment.

FIG. 4 is a block diagram illustrating interfaces between an EV charging device (e.g., wall charging unit) 40 and a power system (battery charging unit, power device, power distribution system) 42 and communications system (server appliance, communications device, server/data communications components) 43 at an electric vehicle 44. Details of the EV charging device 40, power system 42, and communications system 43 are described in detail below with respect to FIGS. 5, 6, and 7, respectively.

While the power system 42 and the communications system 43 are schematically shown as individual devices, the systems may be combined and one or more components shared (e.g., FMP TX, FMP RX, communications or authentication module). For example, reference to the communications system 43 transmitting or receiving data to or from the power system 42 may comprise transmitting or receiving data directly to or from a bi-directional power and data connector at the power system. Also, as described below, the power system 42 and communications system 43 are both configured for transmitting or receiving FMP comprising both power and data. Thus, it is to be understood that while the power system's primary function is battery charging and power distribution, the power system also handles data communications. Similarly, while the communications system's primary function is server/data communications, it may also be configured to receive FMP (power and data) from the power system.

The EV charging device 40 may be, for example, mounted on a wall or other structure or may be a stand-alone unit (module, device, apparatus, components). Power received at the EV charging device 40 may be, for example, utility AC (Alternating Current) power, or DC (Direct Current) power, or power from a solar power system or wind power system (e.g., 380 VDC or other voltage). The EV charging device 40 may be coupled to a data source (e.g., Internet or other data network). As described below, received power and data are combined and converted to Fault Managed Power (FMP) and transmitted to the power system 42 in the electric vehicle 44. The FMP may also be received from the power system 42 at the EV. The power system 42 comprises a bi-directional FMP multi-drop system that allows the utility power, the EV battery, or other sources such as solar or regenerative motor energy to power the EV systems. The embodiments described herein allow for conversion of an entire EV power distribution system to FMP in a single pair or multi-pair system, thereby eliminating heavy wiring and allowing for the use of light gauge wire throughout the electric vehicle, while providing safety features. For example, the use of FMP (power and data with safety features) for all power systems from or to the battery or utility power provides for safe interaction when emergency personnel are responding to an electric vehicle incident.

As previously described, FMP utilizes pulse power with testing between high voltage pulses to provide a safe high-power distribution system. FMP allows for the transfer of 380 VDC or other DC voltage between a source and destination using pulse power and evaluating safety between high voltage pulses. As shown in the simplified voltage trace 41 of FIG. 4, FMP comprises a plurality of voltage pulses (sequence of voltage pulses) in which voltage varies between a small voltage during a pulse-off time 41*a* and a larger voltage during a pulse-on time (high voltage pulse) 41*b*. The FMP may be transmitted as single-phase pulse power over a wire pair or as multi-phase pulse power over multiple wire pairs (FIG. 4). The safety testing between high voltage pulses in the FMP system allows a source to shut down automatically when power wires are exposed to an unintentional load such as from contact with a person. The FMP based system also supports GE (Gigabit Ethernet) data transfer over a single twisted pair, for example. The system provides for fast data analytic off-loading and moving of server data or other data intensive communications activity using 1GE, 10 GE, or faster communications over FMP wiring while the EV batteries are charging.

The bi-directional FMP is coupled to the electric vehicle 44 at the power system 42 through connection 45 as shown in FIG. 4. The connection 45 may be, for example, a cable and plug assembly or a charging arm that contacts a charging plate on the electric vehicle 44. Connection 45 also provides high speed communications over the bi-directional FMP distribution system, thereby allowing for higher speed downloading and uploading to and from the EV servers (at communications system 43) than provided using Wi-Fi or cellular. The power and data connection 45 may comprise, for example, two wires for a single-phase FMP system, six wires (three wire pairs) for three phase (multi-phase) FMP system, or any other number of wires (wire pairs) for any number of phases in a multi-phase system. In one or more embodiments, the cable 45 may also carry additional copper wire, optical fiber, or cooling tubes to provide any combination of power, data, and cooling as described, for example, in U.S. patent application Ser. No. 15/910,203, ("Combined Power, Data, and Cooling Delivery in a Communications Network"), filed Mar. 2, 2018, which is incorporated herein by reference in its entirety.

As described below, the power system 42 may power components at the communications system (server appliance) 43 using conventional power from the battery at connection 46 or through a safer FMP connection 47. The power system 42 may also include a data connection 48 or an FMP connection 49 to the communications system 43 to provide high speed communications during charging. In FIGS. 4, 6, 7, and 8 both connection types are shown (with one shown as a dashed line) for simplification. It is to be understood that only one power connection type (46 or 47) and one data connection type (48 or 49) may be provided between the power system 42 and the communications system 43. In another example, only one FMP (power and data) connection is provided between the power system 42 and communications system 43.

As described in detail below, a trust and authentication system and method may be provided to authenticate the fault managed power and FMP based communications throughout the EV and EV mobile data center functions, thereby allowing for a secure trust layer to ensure that the communications and charging power are all trusted. In one or more embodiments, trust and authentication are provided at the EV charging device 40, power system 42, and server data communications unit 43. The trust and authentication system verifies proper FMP transmitter to FMP receiver interfaces and connections allow only trusted devices to transmit or receive FMP. In the charging system, trust and authentication may be used to prevent destruction of charging systems in public locations.

Figure 5:
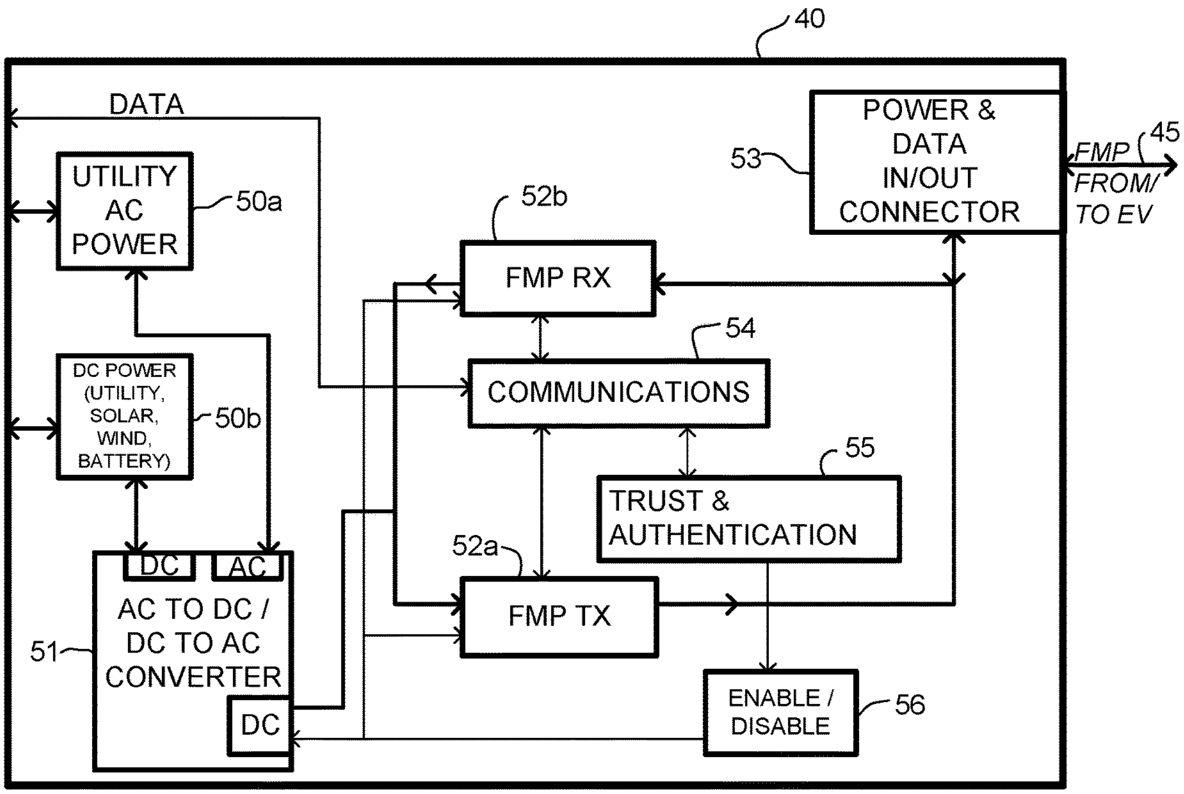
FIG. 5 is a block diagram illustrating details of the electric vehicle charging device, in accordance with one embodiment.

Referring now to FIG. 5, details of the EV charging device 40 are shown in accordance with one embodiment. As previously noted, utility power or power from solar or wind systems may be used to provide power at the EV charging device 40. The block diagram in FIG. 5 illustrates utility AC power received at block 50*a* and DC power received at block 50*b*. These are only examples and the charging unit 40 may be configured for receiving any type of usable power from any source. For example, the bi-directional FMP may be converted from or to power at mobile batteries or a stationary battery system. Power is input to power module 51, which may be configured to convert AC power to DC power or convert DC power to AC power. The power module 51 transmits power to an FMP system comprising an FMP transmitter (TX) 52*a* and FMP receiver (RX) 52*b*. Power and data received at FMP transmitter 52*a* is converted to FMP and delivered to a power and data in/out connector 53 for transmittal to the EV at connection 45. Power received at the power and data connector 53 may also be transmitted to the FMP receiver 52*b* and converted to DC power for use by other systems.

Data (e.g., Internet data or other network data) is received and transmitted at communications block 54. The data is provided to the FMP transmitter 52*a* for transmittal to the EV at the power and data connector 53. Data may also be received from the FMP receiver 52*b* for upload to a network at the communications block 54. For example, a user may connect their electric vehicle for charging at home or work and upload or download data to or from a network while the electric vehicle is charging. In the example shown in FIG. 5, the communications block 54 is in communication with a trust and authentication module 55 for performing authentication functions described herein. The trust and authentication module 55 is in communication with an enable/disable block 56, which may shut down power and data at power module 51, FMP TX 52*a*, or FMP RX 52*b* if authentication fails.

Figure 6:
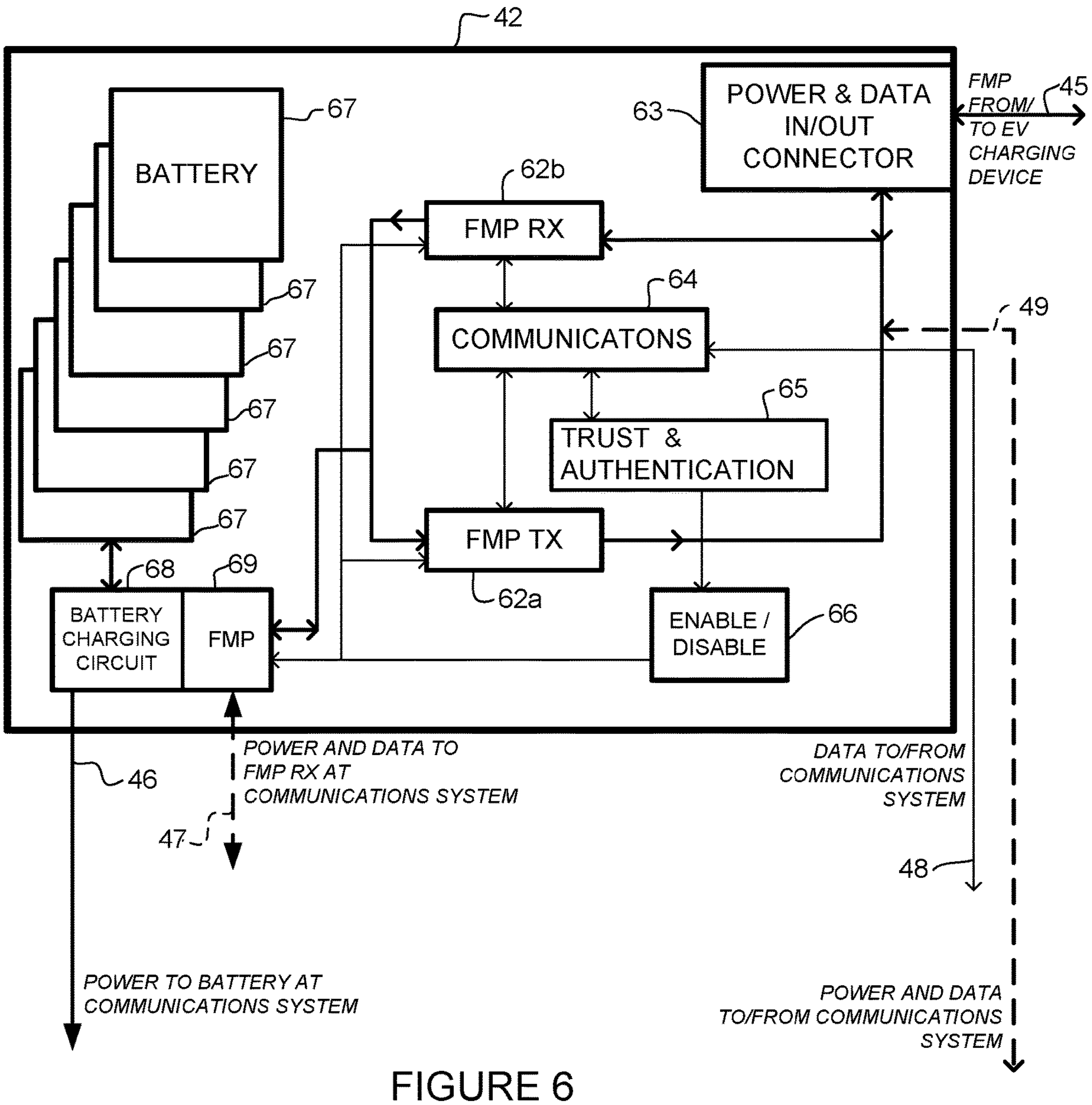
FIG. 6 is a block diagram illustrating details of the power system, in accordance with one embodiment.

Referring now to FIG. 6, details of the power system (battery charging unit) 42 are shown, in accordance with one embodiment. Power and data are received or transmitted at power and data in/out connector 63, which is coupled to the EV charging device 40 at connection 45. It is to be understood that the term "connector" as used herein may refer to a plug type connector or a plate for contact with a charging arm coupled to the EV charging device 40. The power system 42 includes an FMP system comprising an FMP transmitter 62*a*, FMP receiver 62*b*, communications block 64, trust and authentication module 65, and enable/disable block 66 as described above for the EV charging device 40. The trust and authentication module 65 at the power system 42 is used to establish that the power system and a valid EV charging device are directly connected without any middle connection or invalid (unauthorized) charging system.

The FMP system is coupled to a battery charging circuit 68 through FMP block 69, which converts the FMP to power suitable for the battery charging circuit. One or more EV batteries 67 are charged by the battery charging circuit 68. As previously described with respect to FIG. 4, the power system 42 may transmit power directly from the battery charging circuit 68 to the communications system 43 on power line 46 or transmit FMP over line 47. Data may be transmitted directly from communications block 64 to the communications system 43 over line 48 or data and power may be transmitted from the FMP system over line 49 in a multi-drop configuration (described below).

Figure 7:
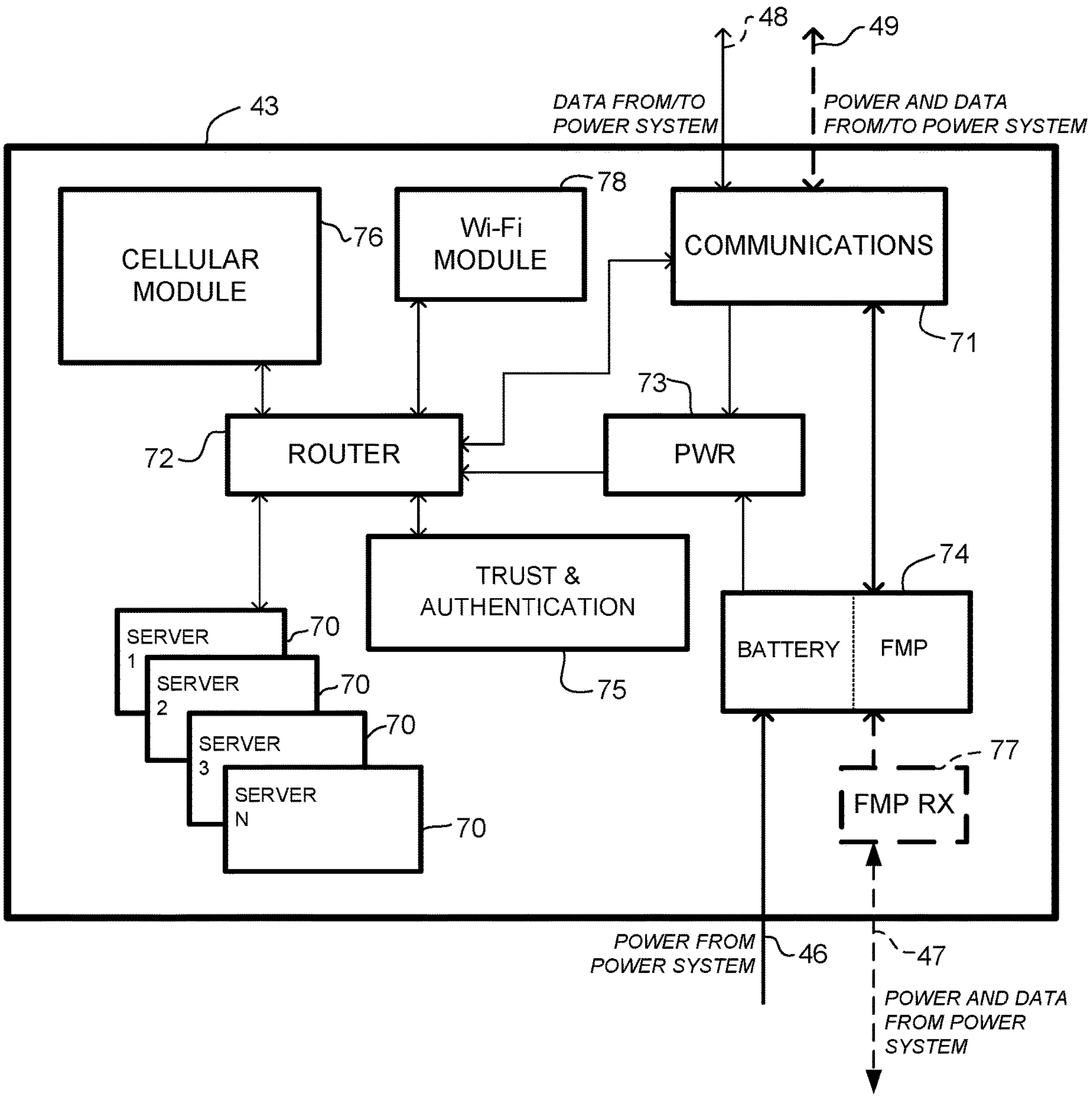
FIG. 7 is a block diagram illustrating details of the communications system, in accordance with one embodiment.

Referring now to FIG. 7, details of the communications system (server appliance) 43 are shown in accordance with one embodiment. As described above with respect to FIG. 2, the communications system includes a cellular module 76 and a Wi-Fi module 78 in communication with a router 72. The router 72 is in communication with one or more servers 70 (Server 1, Server 2, Server 3, Server N). In one example, power and data are received from the power system 42 at connection 49 and power and communications are split at a communications module 71 (FMP communications module) (FIGS. 6 and 7). The communications module 71 may transmit data at 1GE-10GE to the router 72 and transmit power to power module 73, for example. In another example, the communications module receives data from the power system at connection 48. The communications module 71 may include a bi-directional FMP connection with battery/FMP module 74. As previously described, the power system 42 may transmit battery power directly to the battery at line 46 or the communications system 43 may include an FMP receiver 77 for receiving FMP (power and data) at line 47. The communications system 43 also includes a trust and authentication module 75 to provide authentication with the power system 42 before data transfer is permitted, as described below.

Figure 8:
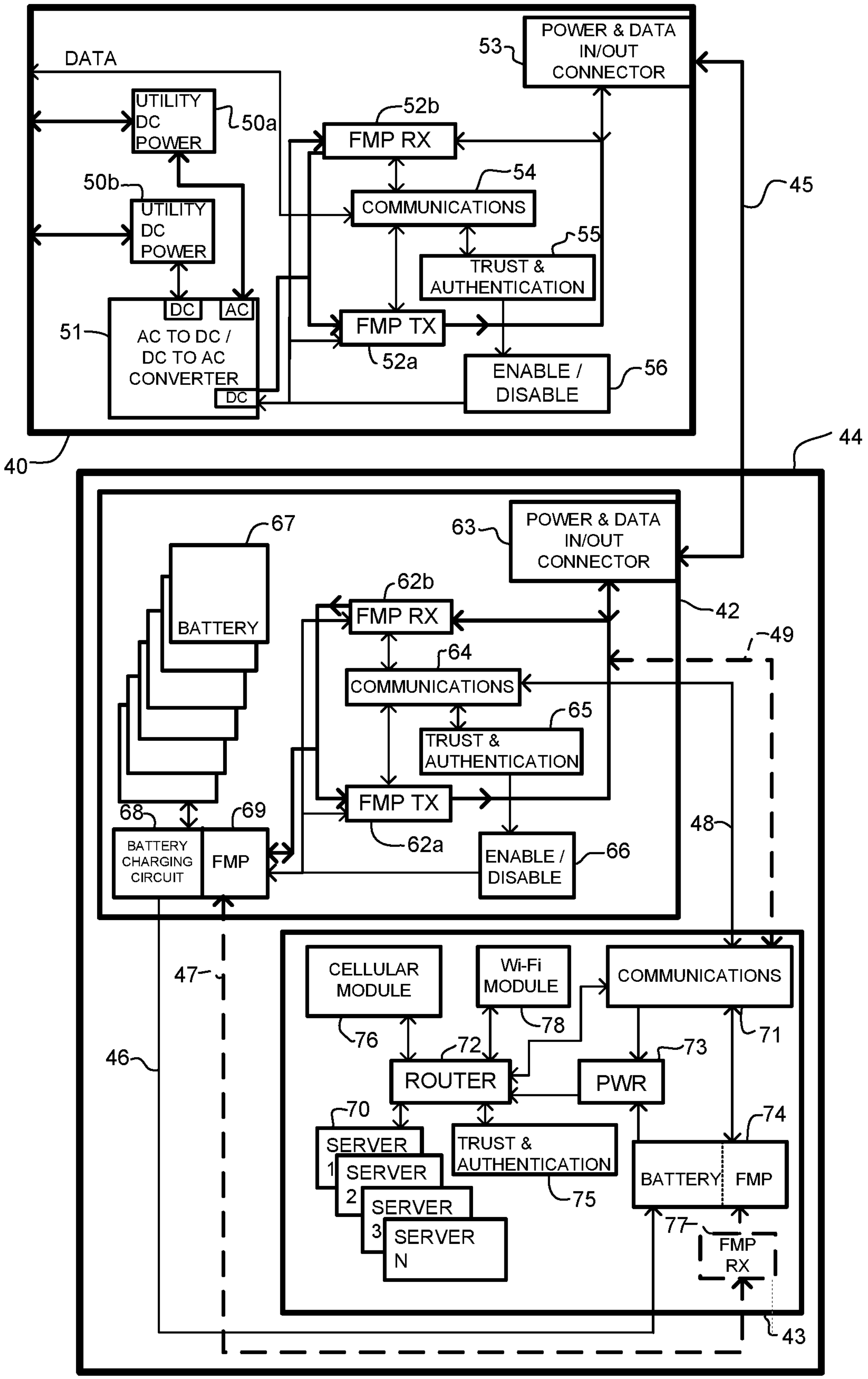
FIG. 8 illustrates the electric vehicle charging device of FIG. 5 coupled with the power system of FIG. 6 and the communications system of FIG. 7.

FIG. 8 shows the EV charging device 40 (FIG. 5) connected to the power system 42 (FIG. 6) and communications system 43 (FIG. 7) at the electric vehicle 44. In one or more embodiments an electric vehicle system comprises the power system 42 for charging one or more batteries 67 installed in the electric vehicle 44 and comprising the bi-directional power and data connector 63 for receiving power and data from or transmitting the power and data to the electric vehicle charging device 40. The communications system 43 comprises one or more servers 70 and is configured for receiving power from the power system 42 and receiving data from or transmitting the data to the power system for download or upload at the electric vehicle charging device. The EV system further includes at least one authentication module 65 for authenticating the electric vehicle charging device 40.

When the power system 42 is connected to the EV charging device 40, the two devices may mutually authenticate with one another. In one example, point-to-point communications may then be protected using MACsec (security). The communications system (server appliance) 43 and power system 42 may also mutually authenticate with one another. The communications system 43 may also mutually authenticate with individual server blades 70. If layer 3 IP (Internet Protocol) communication is used, once the IP is setup, higher layers can then use IP and TLS (Transport Layer Security) for secure communications rather than MACsec.

In one or more embodiments, the trust and authentication modules 54, 64, and 75 may be configured for IEEE 802.1x and EAP (Extensible Authentication Protocol)-TLS authentication using IEEE 802.1AR device identity to provide initial certificate based mutual device identification. In another example, IEEE 802.1x, MACsec may be used to provide continuous in-flight message confidentiality and authentication.

As previously noted with respect to FIG. 3, the system may also include physical security means that prevent a security breach of the system. In one or more embodiments, a physical security state may be communicated to a management device or controller. If tampering with the system is identified, the server may shut down or not boot and a warning message may be generated. A key may be required with user authentication. For example, a thumb print or biometrics and a key may be used to access the system.

It is to be understood that the system shown in FIGS. 4-8 and described above is only an example and the arrangement, number, or type of components included in the power distribution and data communications system or connections between components may be different than shown and described herein, without departing from the scope of the embodiments. For example, the power system 42 and communications system 43 may overlap and combine use of one or more components, such as a trust and authentication system that only authenticates between the EV and the EV charging device 40. Also, as previously noted, additional authentication may be performed at the server blades 70 at the communications system 43. As noted above, different types of power, data, or power and data connections may be provided between the power system 42 and communications system 43. FMP distribution between the power and communications systems provides a safer power distribution system, but may add components or complexity. As previously described, power and data may be delivered together over an FMP connection between the power system 42 and the communications system 43 or a data line may directly connect communications modules at the two units to provide high speed communications during charging.

Figure 9:
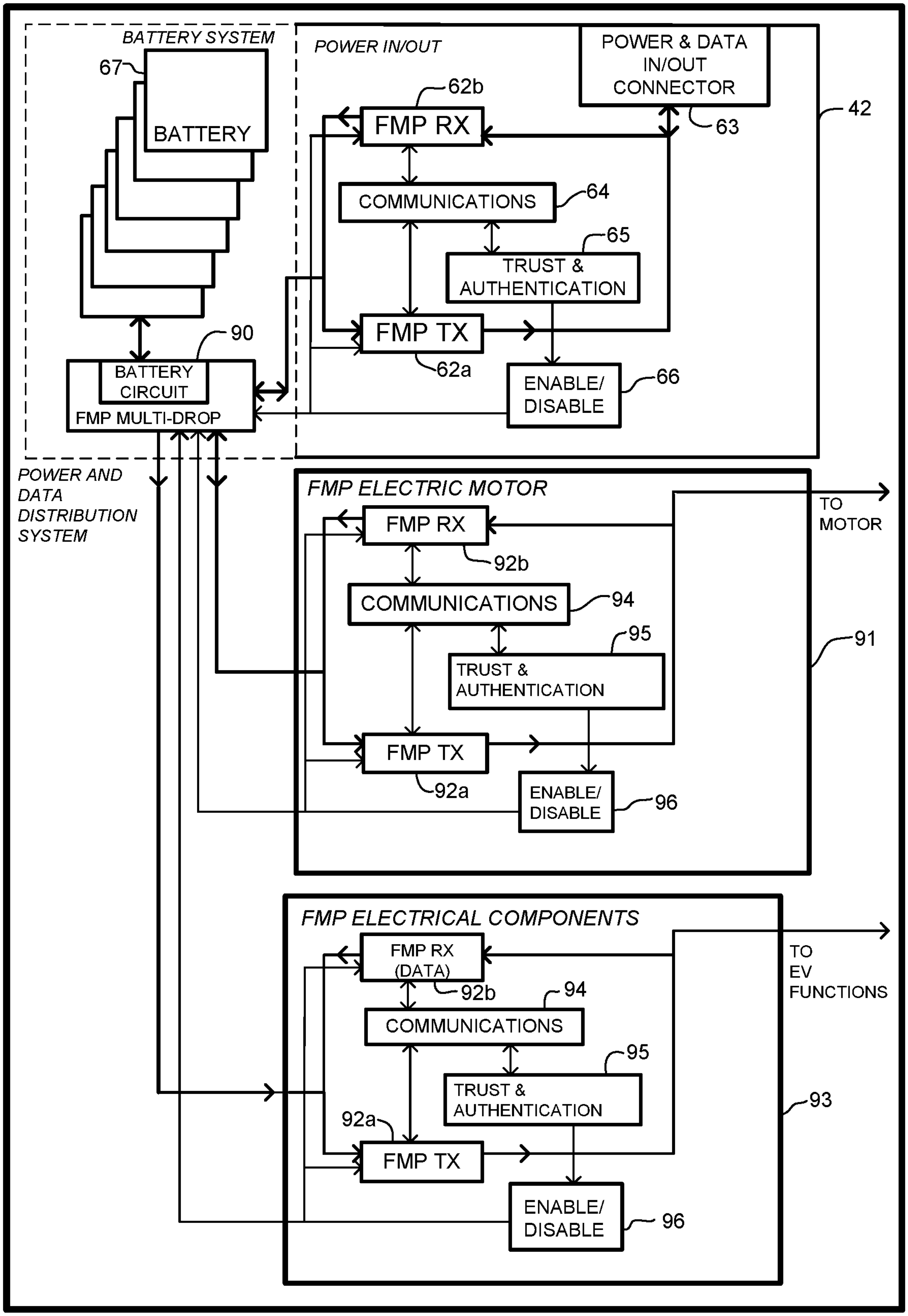
FIG. 9 is a block diagram of a power distribution system within the electric vehicle, in accordance with one embodiment.

FIG. 9 illustrates details of a power distribution system at the electric vehicle, in accordance with one embodiment. In one or more embodiments, the system comprises the bi-directional power and data connector 63 installed in the electric vehicle for receiving or transmitting power and data on wires coupled to the electric vehicle charging device and charging the battery 67 installed in the electric vehicle, a power and data distribution system (battery system comprising FMP multi-drop device 90) coupled to the bi-directional power and data connector 63 (e.g., through FMP circuit at power system 42) for transmitting or receiving the power and data to or from one or more of the servers 70 (FIG. 8), an electric motor 108 (FIG. 10), or electrical components (doors, lights, brakes, heater, steering, etc. in FIG. 11) installed in the electric vehicle, and an authentication system (trust and authentication modules 65, 95) for performing authentication between the power and data distribution system and a power and data system (server appliance 43, FMP electric motor device 91, FMP electrical components device 93) coupled to one or more of the server, the electric motor, or the electrical components.

A battery system includes the batteries 67 and the power in/out block comprising the FMP and communications components previously described with respect to FIG. 6 (power system 42). A battery circuit/FMP multi-drop device 90 may be used to charge the batteries 67 and also provide power and communications to the FMP electric motor device 91 and FMP electrical components device 93. The electric motor device 91 and electrical components device 93 include an FMP transmitter 92*a*, FMP receiver 92*b*, communications module 94, trust and authentication module 95, and enable/disable block 96 as previously described with respect to the power system 42. It may be noted that the receiver block 92*b* at the electrical components device 93 may be configured only as a data receiver since power is only transmitted to the electrical components and not received therefrom, but the communication functions are still needed for data received over FMP. The FMP electric motor device 91 transmits power to and receives power from an electric motor along with communications on an FMP connection. The electrical components device 93 transmits power and bi-directional communications to power electronic components at the EV.

As previously noted, FMP may be delivered in a multi-drop configuration to more than one component. For example, connections may be configured as a series of power adapters ("T" adapters) that have a power input, power output to downstream components, and power output to a powered device. Power is passed through to a downstream device once the device is authenticated for FMP usage, otherwise communications are passed without power. For example, for pass thru operation, power may be enabled after a valid load is detected. During an authentication process, sufficient current is maintained such that a load has enough power to signal authentication and fully power up electrical elements in the chain.

Figure 10:
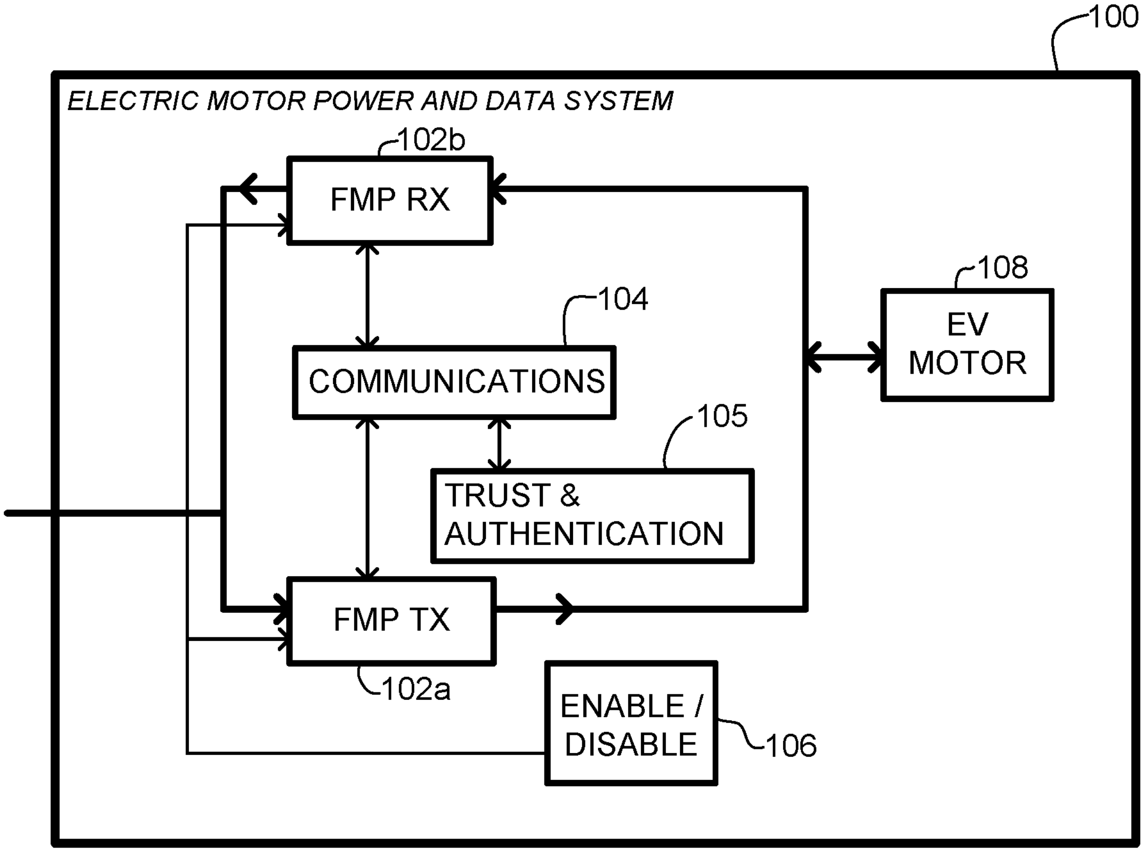
FIG. 10 is a block diagram illustrating a fault managed power electric motor, in accordance with one embodiment.

FIG. 10 illustrates an example of an electric motor power and data system 100, in accordance with one embodiment. An EV motor 108 receives power from FMP transmitter 102*a* and transmits power to FMP receiver 102*b*, which are both coupled to the battery system shown in FIG. 9. The system 100 further includes a communications module 104, trust and authentication module 105, and enable/disable block 106, as previously described for the power system 42. The trust and authentication module 105 may be used to prevent damage to the motor 108 from harmful or incompatible power sources.

Figure 11:
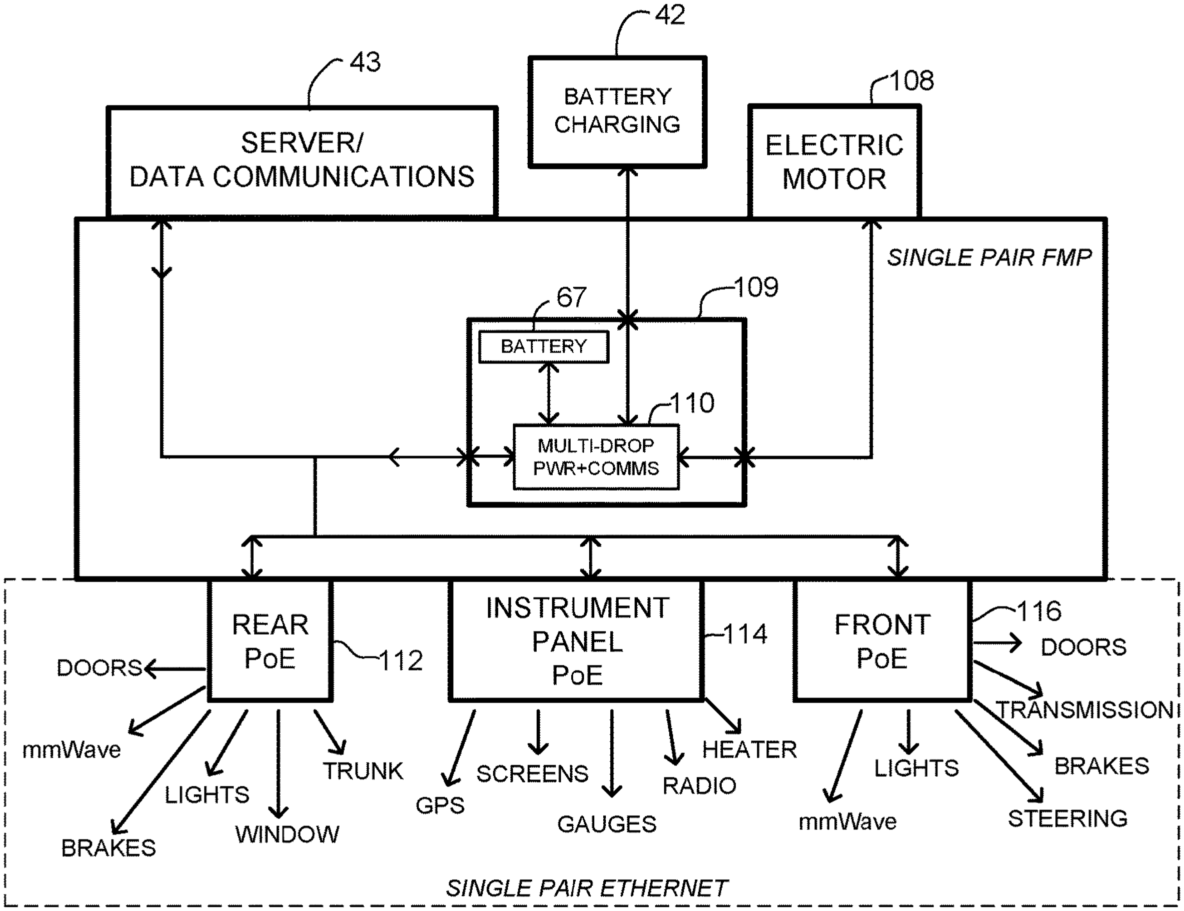
FIG. 11 is a block diagram illustrating power distribution to a plurality of electric components in the electric vehicle, in accordance with one embodiment.

Referring now to FIG. 11, an example of a power and data system for powering electrical components at the electric vehicle is shown, in accordance with one embodiment. The power system 42, communications system 43, and electric motor 108 are shown coupled to a battery system 109 comprising one or more batteries 67 and multi-drop FMP (power and communications) block 110. In one example, single pair FMP is used to transmit power and bi-directional communications to various electrical components at the EV. The single pair FMP may comprise low power multi-drop FMP and up to 10GE data communications over the FMP lines, for example. In the example shown in FIG. 11, the single pair FMP is converted to Single Pair Ethernet (SPE) at one or more conversion units 112, 114, 116. The system may include, for example, a rear PoE unit 112, an instrument panel PoE unit 114, and a front PoE unit 116, each providing power and data through SPE to a group of electrical components. In one example, the rear PoE unit 112 is in communication with doors, an mmWave (millimeter wave) device, rear brakes, lights, windows, and trunk. The instrument panel PoE unit 114 is in communication with GPS (Global Positioning System), screens, gauges, radio, and heater. The front PoE unit 116 is in communication with an mmWave device, lights, steering, brakes, transmission, and doors. It is to be understood that these are only examples and fewer components, additional components, or different electrical components may be powered and controlled by the FMP system described herein.

Figure 12:
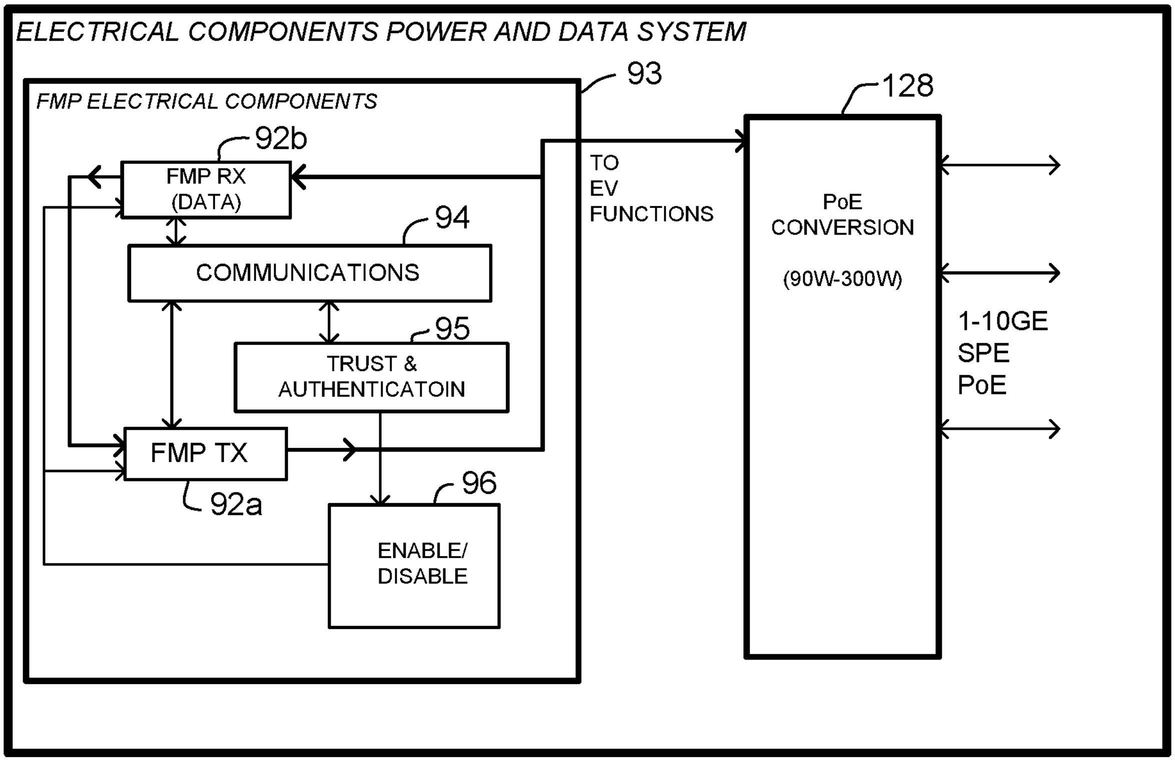
FIG. 12 is a block diagram illustrating conversion of fault managed power to Power over Ethernet, in accordance with one embodiment.

FIG. 12 illustrates an example of an FMP to SPE conversion system for the electrical components of FIG. 11, in accordance with one embodiment. The FMP electrical components device 93 (power and data system) is shown coupled to a PoE conversion unit 128 operable to convert FMP to SPE. In one example, the SPE comprises 90 watt to 300 watt power and 1-10GE data.

The systems shown in FIGS. 8-12 may transfer power, data, or power and data on any suitable connection, including, for example, single pair wire (e.g., single twisted pair, single balanced copper wire pair, single wire pair Ethernet) located in single pair cable (e.g., SPE, Base-T1 Ethernet) or multiple wire pairs located in a multi-pair cable (e.g., two-pair cable, four-pair cable, Base-T1 Ethernet), for example.

Figure 13:
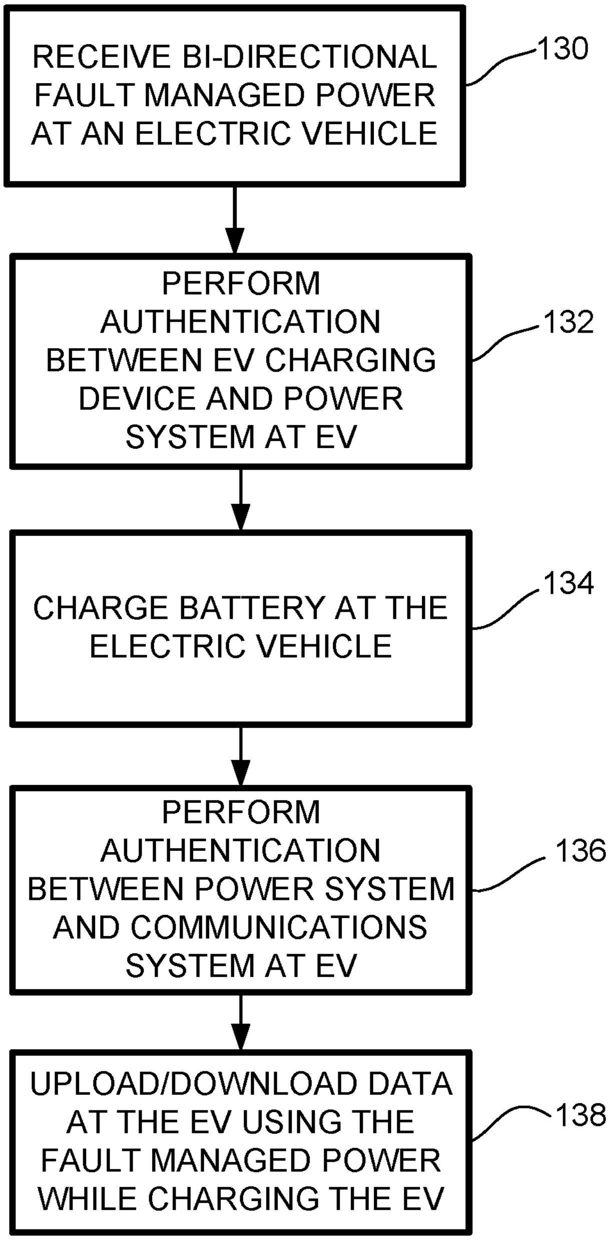
FIG. 13 is a flowchart illustrating an overview of a process for bi-directional power distribution and communications with authentication in an electric vehicle, in accordance with one embodiment.

FIG. 13 is a flowchart illustrating an overview of a process for fault managed power distribution and authentication, in accordance with one embodiment. Bi-directional FMP (power and data with safety features) is received at the EV at step 130. As previously described, FMP may be received from the EV charging device 40 (FIGS. 8 and 13). Authentication is performed between the power system 42 and the EV charging device 40 before enabling power or data transfer between the EV charging device and the EV (step 132). Once authentication is successfully performed, the battery is charged at the EV (step 134). Authentication may also be performed between the power system 42 and the communications system 43 (step 136). Once authentication is passed, data is transferred between the server 70 at the communications system and the electrical vehicle charging device while charging the EV (step 136). As previously described, the data is transferred through the power system, which also powers the communications system. The fault managed power comprises pulse power with testing performed between high voltage pulses, as described above. In one or more embodiments, the FMP comprises multi-phase pulse power.

Figure 14:
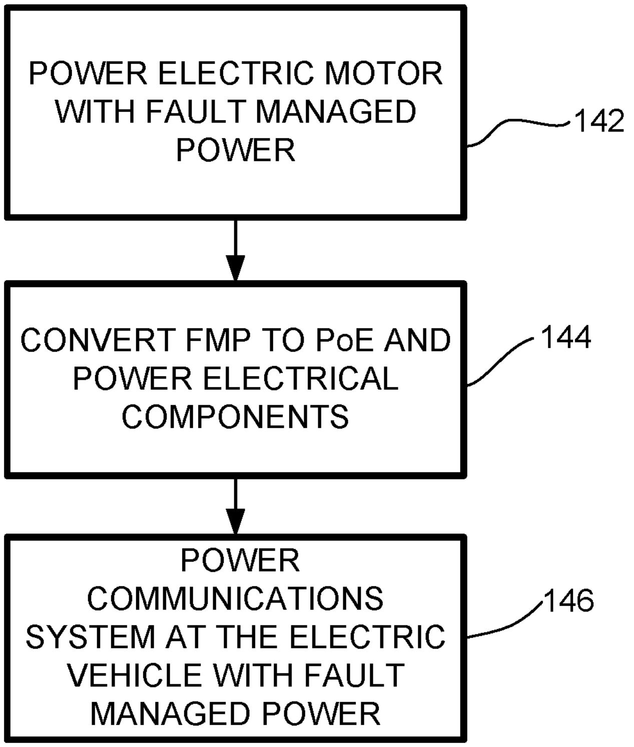
FIG. 14 is a flowchart illustrating an overview of a process for utilizing the fault managed power at the electric vehicle, in accordance with one embodiment.

FIG. 14 is a flowchart illustrating an overview of a process for powering components at the EV using FMP, in accordance with one embodiment. The electric motor is powered with the FMP (step 142). The FMP is converted to PoE and used to power electrical components at the EV (step 144). The communications system is also powered with the FMP (step 146).

It is to be understood that the processes shown in FIGS. 13 and 14 are only examples and that steps may be added, removed, combined, or modified without departing from the scope of the embodiments.

Although the systems, methods, and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:

receiving fault managed power at an electric vehicle, wherein the fault managed power comprises pulse power including alternating high voltage pulses and low voltage intervals, and performing safety testing between the high voltage pulses;

performing authentication between a power system at the electric vehicle and an electric vehicle charging device;

charging a battery at the electric vehicle upon passing said authentication at the power system;

performing authentication at a communications system; and transferring data between a server at the communications system and the electric vehicle charging device upon passing said authentication at the communications system, wherein the data is transmitted in-band with the fault managed power over one or more wires or wire pairs.

2. The method of claim 1, wherein the fault managed power comprises single phase pulse power with testing performed between high voltage pulses.

3. The method of claim 1, wherein the fault managed power comprises multi-phase pulse power with testing performed between high voltage pulses.

4. The method of claim 1, further comprising converting the fault managed power and the data to Power over Ethernet for use by electrical components at the electric vehicle.

5. The method of claim 1, further comprising performing authentication between the power system and the communications system.

6. The method of claim 1, wherein the power system and the communications system are in communication over a bi-directional power and data connection.

7. The method of claim 1, wherein the server comprises a plurality of servers operable to upload and download the data to and from an electric vehicle data center.

8. The method of claim 1, wherein the power system is coupled to an electric motor device and an electrical component device for transmitting the data and the fault managed power to or receiving the data and the fault managed power from the electric motor device and electrical components.

9. A system comprising:

an electric vehicle comprising a power system configured to receive fault managed power at the electric vehicle, wherein the fault managed power comprises pulse power including alternating high voltage pulses and low voltage intervals, and the power system is configured to perform safety testing between the high voltage pulses;

an electric vehicle charging device;

a first authentication system configured to perform authentication between the power system at the electric vehicle and the electric vehicle charging device;

a communications system that includes a server; and a second authentication system configured to perform authentication at the communications system, wherein data is transferred between the server at the communications system and the electric vehicle charging device upon passing authentication at the communications system, wherein the data is transmitted in-band with the fault managed power over one or more wires or wire pairs.

10. The system of claim 9, wherein the fault managed power comprises a plurality of high voltage pulses with safety testing between said high voltage pulses.

11. The system of claim 9, further comprising a power converter for converting the fault managed power and the data to Power over Ethernet for use by electrical components at the electric vehicle.

12. The system of claim 11, further comprising a distribution system configured to transmit the power and the data for the server, an electric motor of the electric vehicle, and electrical components of the electric vehicle, wherein the power comprises fault managed power.

13. The system of claim 12, wherein the distribution system is operable to transmit data to the server over a Gigabit Ethernet data connection.

14. The system of claim 9, wherein the power system is coupled to an electric motor device and an electrical component device, and is configured to transmit the data and the fault managed power to or receive the data and the fault managed power from the electric motor device and the electrical component device, wherein each of the electric motor device and the electrical component device comprises another authentication module for authenticating with the power system.

15. The system of claim 9, wherein the server comprises a plurality of servers operable to upload and download the data to and from an electric vehicle data center.

16. An electric vehicle system comprising:

a bi-directional power and data connector configured to couple to an electric vehicle charging device;

a fault managed power (FMP) system configured to receive electrical power from the electric vehicle charging device, and transmit the electrical power as pulse power comprising a sequence of alternating high voltage pulses and low voltage intervals;

a communications system comprising at least one server;

a power and data interface configured to transmit both power and data between the FMP system and the communications system over one or more wires or wire pairs;

a first authentication module configured to authenticate the electric vehicle charging device prior to enabling delivery of the pulse power; and a second authentication module configured to authenticate communications between the communications system and the electric vehicle charging device, wherein:

(i) safety testing is performed during the low voltage intervals between the high voltage pulses, and (ii) data is transmitted in-band with the pulse power between the electric vehicle charging device and the communications system.

17. The electric vehicle system of claim 16, wherein the pulse power comprises multi-phase pulse power with pulses offset across a plurality of wires or wire pairs to provide continuous power delivery.

18. The electric vehicle system of claim 16, wherein the safety testing comprises fault detection performed between the high voltage pulses to detect line-to-line or line-to-ground faults.

19. The electric vehicle system of claim 16, wherein the data transmitted in-band with the pulse power comprises Ethernet data transmitted over a single pair of wires.

20. The electric vehicle system of claim 16, further comprising a distribution system configured to distribute the pulse power and the data to at least one of: an electric motor, electrical components of an electric vehicle, or the communications system.

* * * * *